Sept. 15, 1931.                C. H. NENSTIEHL                1,823,697
                                  HANDCUFFS
                              Filed Oct. 25, 1926
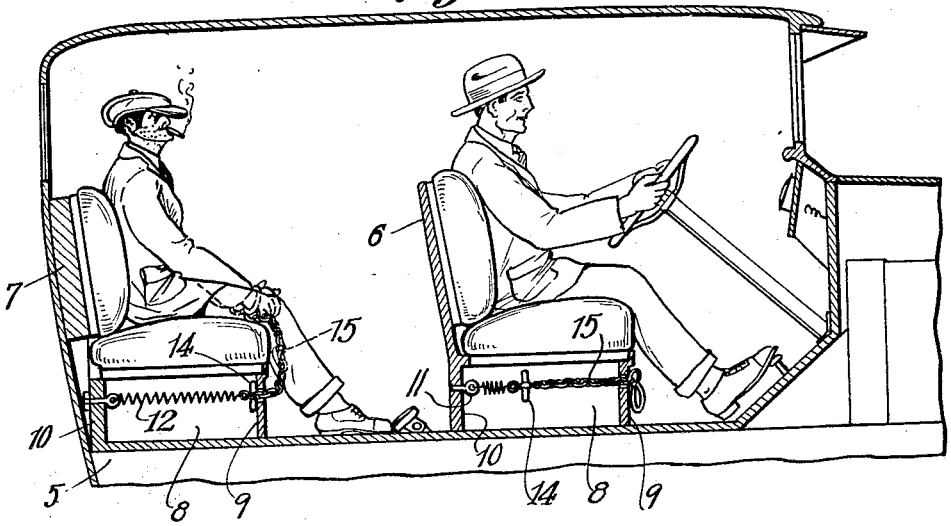
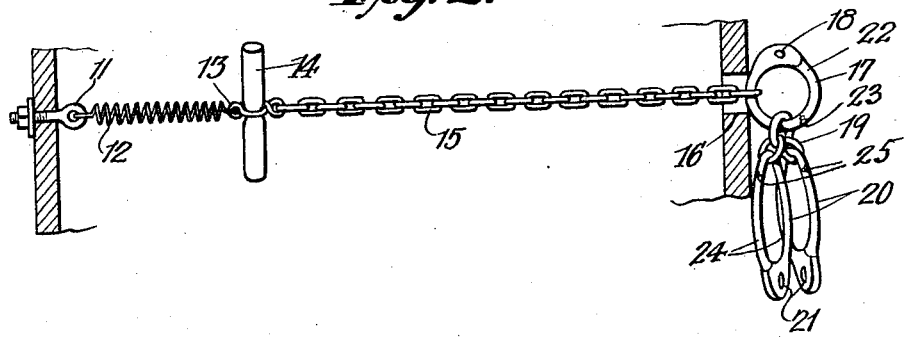
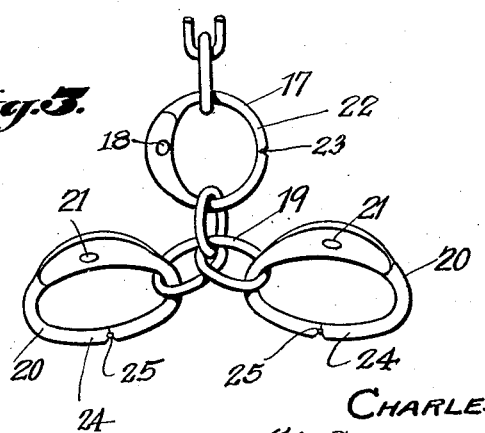
Inventor
CHARLES H. NENSTIEHL
By His Attorney Patented Sept. 15, 1931

1,823,697

UNITED STATES PATENT OFFICE

CHARLES H. NENSTIEHL, OF HUNTINGTON STATION, NEW YORK

HANDCUFFS

Application filed October 25, 1926. Serial No. 144,064.

This invention relates to a handcuff and one particularly adapted for use in connection with automobiles which are used to convey criminals.

A particular object of the invention is to provide a handcuff device in connection with an automobile seat through the medium of which a prisoner can be rendered helpless during transportation from one place to another.

A still further object of the invention is to provide a handcuff arrangement in connection with an automobile which will imprison the criminal and will prevent his moving about in the back of the automobile and will thwart his efforts to injure the driver of the car or other passengers in an effort to escape.

A still further object of the invention is to provide a handcuff arrangement which will be an assurance of safety for the driver and the delivery of his prisoners, and one which will not in any way damage or make necessary structural changes in a vehicle and one which can be used to hold within the vehicle any number of prisoners, which can be seated therein.

To enable others skilled in the art to fully comprehend the underlying features of my invention that they may embody the same in the various modifications in structure and relation contemplated, a drawing depicting a preferred form has been annexed as a part of this disclosure and in such drawings, similar reference characters denote corresponding parts throughout all the views, of which, Figure 1 is a view in side elevation of a part of a vehicle, for, for instance, as an automobile, the same being shown in section to illustrate the use of my improved handcuffs in connection with the rear and front seats of an automobile during its use to convey a prisoner from one place to another.

Figure 2 is an enlarged view in side elevation of the handcuff arrangement in connection with the seat, showing the position the handcuffs assume when not in use, and Figure 3 is a fragmentary view, greatly enlarged, of the handcuff showing in connection therewith a locking ring which is used when the prisoner is to be removed from the vehicle without requiring the unlocking of his hands.

Referring to the drawings in detail, 5 indicates a vehicle having built therein in the usual manner, a front seat 6 and rear seat 7. Beneath each of the seats, there is provided the usual under compartment 8 which is closed at the front by the panels 9 and at the rear, by the rear wall or panels 10, all as is common in seat construction, the front panel 9 being preferably of heavy metal and so arranged that it cannot be readily removed.

In the transportation of prisoners by the sheriff from the court house to the prison, for instance, or in the transportation of the criminally insane from hospitals to asylums, great difficulty has been encountered in view of the fact that no way has been provided for holding the prisoner in place in the vehicle and to overcome this objection, I have provided in the rear wall 10 of the seat, a suitable eye bolt 11 which holds in position one end of a coil spring 12, the opposite end of the spring being secured in the chain link 13 which holds at its center and passing therethrough the retaining bar or rod 14. This retaining bar is at the inner termination of a handcuff holding chain 15 which extends forwardly and through a suitable small sized opening 16 in the front panel 9 of the seat, it being of course understood that any number of these handcuffs may be used in connection with any particular seat or in any style of vehicle and I am not confined to the showing in Figure 1, it being readily understood that the chain could be concealed in some other manner or that it might be carried exteriorly of the seat, such as from the floor without affecting the scope of my invention. However, it is preferably to have the handcuffs and chain and other attachments, when not in use, concealed so that the sheriff or the owner of the car can use the same without having the handcuffs or chain in the way of the occupants of the car, when the same is used for official purposes.

In order to prevent the chain from being drawn entirely through the opening 16 by the coil spring 12, I provide an enlarged locking ring 17 one part 22 of which is key locked in the usual manner as by the lock 18 and which can open about its hinge 23 in the nature of a shackle to release the links 19. One of each of said links holds the handcuff members 20, which in turn are locked through the medium of the key locks 21, which hold the sections 24 closed, which are hinged as at 25, it being of course evident that these handcuffs 20 can be locked about the wrists of the prisoner and he can be escorted to or from the car and when seated therein, one of the links 19 can be secured to the locking ring 17 which may then be drawn upon by the prisoner until the spring is drawn out sufficiently to enable him to set in erect position, as shown in Figure 1.

It will be evident that my arrangement affords not only comfort but security to the driver of the vehicle inasmuch as the prisoner in the back seat is limited in his movements by the locking rod 14 which engages the inside of the front panel 9 and prevents him moving to an advantageous position.

It is evident that when the prisoner is released, that is when the links 19 are removed from the locking ring 17 in order to take the prisoner out of the car, that the spring 12 will retract the chain 15 through the opening 16 until the locking ring 17 is in position at the edge of the opening to prevent further withdrawal of the chain by the spring 12. When the prisoner has been delivered and the sheriff returns to the vehicle, he can then relock the handcuffs in position in the locking ring and they will assume the position shown in Figure 1 under the front seat. It is of course understood that my appliance can be used in conjunction with both front and rear seats or with only the rear seat, as desired.

In the position shown in Figure 1, in the front seat, the handcuffs will be out of the way and in view of the fact that the usual apron which hangs down from the edge of the front seat is used, they will be concealed from view during the normal use of the car.

It is evident therefore, that I have provided a safety device which prevents the criminal placed in the back seat from getting up and doing damage to the driver or other passenger in the vehicle and it also decreases the worry of the officer who is driving the car by preventing movement of the criminal carried on the back seat.

My invention also allows a single officer to escort several prisoners to a jail or to an asylum in safety with the assurance that they are securely locked to the vehicle and cannot attack him from the rear.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claims.

Having thus described my invention what I claim as new and desire to secure by United States Letters Patent is:—

In combination, a fixed eye member, a chain, a stop bar carried by the chain, a spring connected to the chain and the eye member, the chain being arranged to pass through a wall opening and being limited in its passage in one direction therethrough by said stop bar, a ring on said chain and handcuffs secured to said ring, and said ring also acting to prevent complete passage of the chain in the opposite direction through said wall opening.

In testimony whereof I affix my signature.
CHARLES H. NENSTIEHL. [L. S.]